(12) United States Patent
Brown

(10) Patent No.: US 8,077,967 B2
(45) Date of Patent: Dec. 13, 2011

(54) CONTINUOUS COLOR GRADING TECHNIQUE

(75) Inventor: Terry Scott Brown, Beacon, NY (US)

(73) Assignee: Thomson Licensing, Boulogne-Bellancourt (FR)

( * ) Notice: Subject to any disclaimer, the term of this patent is extended or adjusted under 35 U.S.C. 154(b) by 739 days.

(21) Appl. No.: 12/223,886

(22) PCT Filed: Dec. 20, 2006

(86) PCT No.: PCT/US2006/048595
§ 371 (c)(1),
(2), (4) Date: Aug. 12, 2008

(87) PCT Pub. No.: WO2007/097803
PCT Pub. Date: Aug. 30, 2007

(65) Prior Publication Data
US 2010/0158366 A1     Jun. 24, 2010

Related U.S. Application Data

(60) Provisional application No. 60/773,807, filed on Feb. 15, 2006.

(51) Int. Cl.
G06K 9/00    (2006.01)
G06K 9/36    (2006.01)
(52) U.S. Cl. .................................................. 382/167
(58) Field of Classification Search .............. 382/162, 382/164, 167; 358/1.5, 515, 518; 348/96, 348/222.1, 223.1, 577, 650, 655; 430/21; 352/38, 85; 355/22, 40, 77; 707/1, 104.1, 707/204
See application file for complete search history.

(56) References Cited

U.S. PATENT DOCUMENTS

| | | | | | |
|---|---|---|---|---|---|
| 3,824,336 | A | * | 7/1974 | Gould et al. | 386/278 |
| 4,367,284 | A | * | 1/1983 | Cellone et al. | 430/539 |
| 4,714,962 | A | * | 12/1987 | Levine | 348/64 |
| 4,945,406 | A | * | 7/1990 | Cok | 358/506 |
| 5,512,396 | A | * | 4/1996 | Hicks | 430/21 |

(Continued)

FOREIGN PATENT DOCUMENTS

EP        1237379        9/2002

OTHER PUBLICATIONS

Senge et al.:"High Speed Film Scanning: Resolution Independent Film-Mastering", International Broadcasting Convention, Amsterdam, Netherlands, Sep. 12-16, 1996, Conference Publication No. 428, pp. 381-385, ,XP006510050.

(Continued)

*Primary Examiner* — Amir Alavi
(74) *Attorney, Agent, or Firm* — Robert D. Shedd; Robert B. Levy

(57)        ABSTRACT

The continuity of at least one image characteristic, such as color, is maintained through image creation, processing and distribution by correlating that characteristic to a frame of reference. During a first processing operation such as image capture, an initial image decision list is generated indicative of at least a one change in at least one characteristic of an image adjusted during that operation. At the completion of that operation, the image is transformed to emulate a film print that serves as the reference for subsequent operations. In this way, the initial image decision list can be modified list to further adjust of the at least one characteristic of the image using the emulated film print during a second image processing operation.

18 Claims, 9 Drawing Sheets

U.S. PATENT DOCUMENTS

| | | | | |
|---|---|---|---|---|
| 5,574,659 | A | * | 11/1996 | Delvers et al. ............... 358/296 |
| 5,752,122 | A | * | 5/1998 | Ishikawa ..................... 396/612 |
| 5,917,914 | A | * | 6/1999 | Shaw et al. ................... 380/42 |
| 6,215,901 | B1 | * | 4/2001 | Schwartz ..................... 382/186 |
| 6,433,824 | B1 | * | 8/2002 | Tanaka et al. ............... 348/345 |
| 6,871,003 | B1 | | 3/2005 | Phillips et al. |
| 6,972,828 | B2 | | 12/2005 | Bogdanowicz et al. |
| 7,295,281 | B2 | * | 11/2007 | Duffield et al. ............... 352/38 |
| 7,856,414 | B2 | * | 12/2010 | Zee ..................................... 1/1 |
| 7,876,955 | B2 | * | 1/2011 | Komiya et al. .............. 382/162 |
| 2005/0134801 | A1 | | 6/2005 | Bogdanowicz et al. |
| 2005/0179775 | A1 | | 8/2005 | Rodriguez et al. |
| 2005/0280842 | A1 | | 12/2005 | Rodriguez et al. |
| 2007/0268411 | A1 | * | 11/2007 | Rehm et al. .................. 348/650 |
| 2010/0158366 | A1 | * | 6/2010 | Brown ......................... 382/167 |

OTHER PUBLICATIONS

"AAF Association Specification" Advanced Authoring Format (AAF), Object Specification v1.0.1, pp. 1-119, XP002369107.

"DIG35 Specification: Metadata for Digital Images—Version 1.1," Internet Citation, pp. 1-219, Jun. 18, 2001, XP002224803.

International Search Report, dated Jul. 17, 2007.

* cited by examiner

CONTINUOUS COLOR GRADING TECHNIQUE

CROSS-REFERENCE TO RELATED APPLICATIONS

This application claims the benefit, under 35 U.S.C. §365 of International Application PCT/US2006/048595, filed Dec. 20, 2006, which was published in accordance with PCT Article 21(2) on Aug. 30, 2007, in English and which claims the benefit of U.S. provisional patent application No. 60/773,807, filed on Feb. 15, 2006, in English.

TECHNICAL FIELD

This invention relates to a technique for maintaining the consistency of at least one image parameter, such as color, during different phases of producing an audio-visual program, such as a movies or television show.

BACKGROUND ART

Providers of audio-visual programs, such as movies, and television shows generally follow a well known workflow to create, process, and distribute such audio-visual programs to viewers. The process of creating content generally entails the capture of visual images and audio (although in some instances, the audio gets added and/or modified after image capture). Traditionally, motion picture film cameras have been used to capture visual images. While film cameras often remain the device of choice, digital video cameras, such as the Thomson Grass Valley Viper film stream camera have increased in popularity. The use of digital video cameras afford the advantage of eliminating the need to digitize the images captured by the film camera(s) for subsequent digital processing, e.g., adding visual effects.

In the course of content creation, the director and/or director of photography typically want to review all or at least a portion of the captured images, usually on a daily basis. The terms "digital dailies" or "rushes" generally refer to the captured images viewed on such a daily basis. In the case of film, the captured images usually undergo a transfer to a telecine device such as the Thomson Grass Valley Spirit telecine device. The telecine device scans the film to create a digital output file(s) or a digital video signal for recording and for display on a television set or digital projector. In some instances, such digital output file(s) first undergo processing prior to display. In the course of scanning the film, a colorist can apply color correction, giving rise to a color decision list (CDL) that typically exists as metadata associated with the digital output file(s) of the telecine. Such metadata will indicate the color correction decisions made by the colorist. By its very nature, a digital video camera, such as the Thomson Grass Valley Viper digital video camera, produces digital output file(s) representative of the captured images. Thus, no need exists for any transfer to a telecine device. Like the digital output file(s) from the telecine, the digital output file(s) from the digital video camera(s) usually undergo color correction in the course of creating digital dailies (i.e., digital files representative of captured images).

In the past, the CDL generated in the course of creating digital dailies has played little if any role in later processing operations such as Digital Intermediate generation. Presently, each successive processing operation in the workflow associated with the creation, processing and production of an audio-visual program produces different CDLs that bear little if any relationship with the CDL created during any of the preceding processing operations. One reason for the lack of a relationship between the CDLs associated with successive processing operations has been the inability to provide a consistent frame of reference (base exposure and color and final intended display device emulation) for such CDL for each processing operation.

Thus a need exists for an image processing technique that enables image processing information, such as, but not limited to, the CDL associated with a given processing operation to be carried forward to a subsequent processing operation.

BRIEF SUMMARY OF THE INVENTION

Briefly, in accordance with an illustrative embodiment of the present principles, there is provided a method for processing image information that enables at least one image decision list associated with a given image processing operation to be carried through to at least one subsequent processing operation. The method of the present principles commences by generating initial image decision list indicative of a change in at least one image characteristic adjusted during a first image processing operation. For example, the initial image decision list could comprise a Color Decision List (CDL) indicative of a color adjustment made during an image processing operation. This operation can include displaying the image while emulating the final intended display medium. During a second image processing operation, the initial image decision list undergoes modification to further adjust the at least one image characteristic in accordance with the emulating the final intended display medium used in the first step. In the case of film, a rescan of the film must yield the identical relationship of density (and color) to code value of the original scan by using a standardized calibration procedure.

The method of the present principles advantageously enables an image decision list, such as a CDL, made during a particular image processing operation to be carried forward during a subsequent processing operation. The transformation of the image following the initial processing operation while emulating the final intended display medium, and same emulation (and standardized calibration procedure if a rescan is required) as the basis for making subsequent image adjustments affords a mechanism for normalizing the image decision list made during each processing operation. In this way, the images decision list will track image adjustments during subsequent image processing operations.

DETAILED DESCRIPTION

Figure 1:
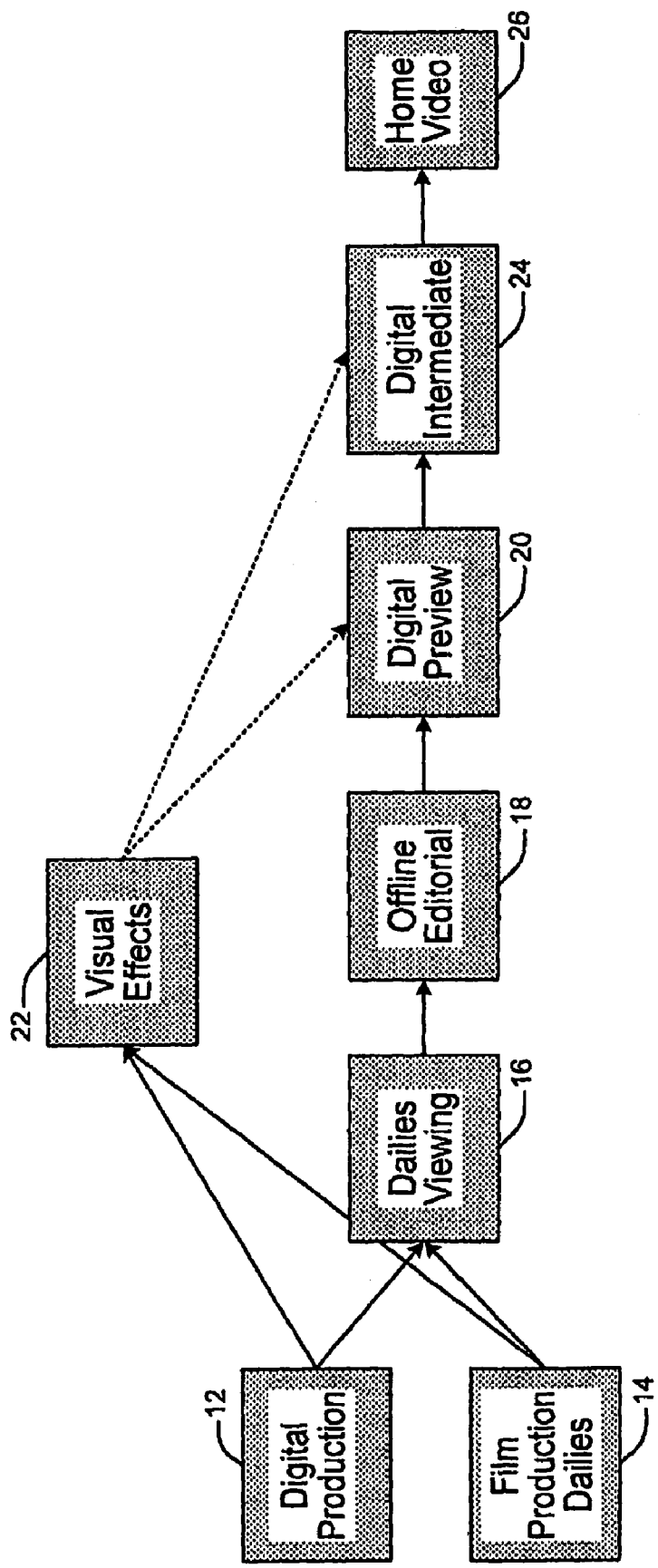
FIG. 1 depicts a flow chart illustrating the elements of a workflow for producing an audio-visual program in accordance with an illustrative embodiment of the present principles.

FIG. 1 depicts the elements in a workflow 10 associated with the production of an audio-visual work in accordance with a preferred embodiment of the present principles. Illustratively in FIG. 1, the audio-visual program takes the form of a pre-recorded digital versatile disc (DVD), some times referred to as a digital video disk, containing at least one feature presentation such as a movie or television show. Alternatively, or in addition to the pre-recorded DVD, the audio-visual program could take the form of a movie in either digital or analog form for theatrical presentation.

The workflow 10 commences with content creation (e.g., image capture) by making use of one or more digital image capture devices (e.g., Thomson Grass Valley Viper film stream cameras) during digital production in step 12. Image capture also can occur during by making use of one or more film cameras during film production in step 14. (Indeed both digital production and film production could occur in some circumstances) The capture of audio information can occur simultaneously during either of steps 12 or 14. Alternatively, or in addition to audio capture during image capture, audio capture and/or processing can occur during subsequent processing operations.

During digital production in step 12, preliminary adjustments to the captured images, can occur such as, but not limited to, color adjustment, by passing the digital video output signal/file(s) of the digital image capture device(s) through a color corrector (not shown) in a manner describer in greater detail hereinafter. In the case of color adjustment, the transfer of the digital output signal/file(s) through the color corrector will yield a color decision list (CDL), taking the form of metadata reflective of the color adjustments that were made.

In the case of film production during step 14, the film typically undergoes transfer to a telecine device (not shown), such as the Thomson Grass Valley Spirit film scanner which has been calibrated to a reference film, allowing repeatability in successive scans, to yield a digital output signal/file(s) as described in greater detail hereinafter. Just as the digital output signal/file(s) generated during digital production in step 12 can undergo color correction, the digital output signal/file (s) generated by the telecine device during step 14 can also undergo transfer through a color corrector, thereby giving rise to a CDL indicative of the color adjustments that were made.

Following steps 12 or 14, the individuals responsible for content creation, such as the Director and/or the Director of Photography, often want to view all or a portion of the captured images, usually on a daily basis, during step 16. The portions of the captured images that undergo daily viewing bear the designation "dailies" or "rushes". In the case of images captured by the digital image capture devices during digital production in step 12, the viewing of dailies during step 16 can occur by simply transferring the digital output file(s) following image (e.g., color) correction, if any to a digital display device, e.g., a television monitor or digital projector. In the case of film production, the viewing of dailies during step 16 occurs by sending the digital output signal/file (s) from the film scanner following image (e.g., color) correction if any, to the display device.

During dailies viewing in step 16, the Director and/or Director of Photography might wish to make further make image adjustments, such as color correction, in addition to those previously made during steps 12 and 14. Typically, color adjustments can be made by the use of a color corrector (not shown). Previously, the CDL initially obtained during steps 12 and 14 had was not passed to step 16, and for that matter, any of the succeeding processing operations. The lack of transference of the CDLs to successive image processing operations stemmed from the lack of a common frame of reference. For example, the digital video output signal/file(s)s generated at the completion of steps 12 and 14, when displayed on one type digital output device will not necessarily have the same appearance (i.e., "look") as the color-corrected dailies viewed during step 16 even if the initial CDLs undergoes an adjustment to correspond to the CDL associated with dailies viewing during step 16.

As described in greater detail below, the technique of the present principles overcomes this disadvantage by providing a common frame of reference for the CDLs created during successive processing operations. The digital output signal/file(s)s generated during each of steps 12 and 14 undergoes a transformation via a Look-Up table (LUT) described hereinafter, to yield digital output signal/file(s) whose images emulate a "normal" film print. Thus, the CDL created during each of steps 12 and 14 becomes correlated to the emulated film print.

During step 16, the color-corrected digital output signal/file(s) also undergo transformation to emulate a film print. Further, the device(s) utilized for display (e.g., the digital television set or digital projector) comprise calibrated devices. Thus, the digital video output file whose images emulate a film print will possess the same appearance regardless of the display device. Therefore, the CDL associated with the dailies viewing during step 16 could be obtained by a prescribed modification to initial CDL obtained during steps 12 or 14. In other words, the CDL obtained during steps 12 or 14 can serve as the starting point for subsequent adjustments.

During step 16, the digital video output signal/file(s) also undergo a transformation to emulate film print. The digital output signal/file(s)s generated following such transformation serves as the input signal/file(s) to the offline editorial operation performed during step 18. During step 18, the received input signal/file(s) typically undergo subsequent processing including, but not limited to, image editing, the addition of audio, and/or compression. As with the previous image processing operations, the digital video output signal/file(s) at the end of step 18 undergo a transformation to emulate a film print prior to receipt at step 20 during which preview screenings occur.

The preview screening operation of step 20 also receives as an input the visual effects created during step 22. In practice, digital video output signal/file(s) generated during steps 12 and 14 undergo transfer to a special effects facility, along with the initial CDLs and a three-dimensional Look Up-Table.

This LUT enables the transformation of the digital output signal/file(s) completed in the course of special effects creation in step 22 to emulate a film print. During step 20, the special effects produced at the completion of step 22 and the digital output signal/file(s) produced following the offline editorial processing during step.18 undergo conformation. Such conformation corresponds to the traditional process of segmentation and rearrangement of original camera negatives (OCNs) to yield a motion picture film. During preview screening in step 20, one or more colorists will make final color adjustments using the CDLs generated during the previous processing operations steps as the starting points for final color grading. The use of LUTs to transform the digital output signal/file(s) at each processing operation to emulate a film print makes this possible. Following final color grading, a master CDL gets saved, and new files with corrections burned in undergo rendering and transformation via a LUT to yield an output file whose images emulate a film print for screening at the completion of step 20.

Along with the special effects generated during step 22, the transformed digital output signal/file(s) generated during step 20 serve as the input to the process of creating digital intermediates (e.g. digital audio-visual programs) during step 24. During step 24, the received digital signal/file(s) undergo further conformation and a master CDL created during step 20 gets loaded into a Digital Intermediate color correction system (not shown) which can take the same form as the color correction system used for conformation during step 20. To the extent that the captured images were originated during film production in step 14, the original negative typically will undergo calibrated scanning at a higher resolution, 2K or 4K. This higher resolution digital video output file gets conformed and loaded into the Digital Intermediate color correction system for final color grading and subsequent rendering during which a final color grade gets applied. As before, the master CDL created during such color grading gets saved. The digital video output signal/file(s) produced during step 24 undergoes transformation via an LUT to emulate a film print that can then undergo distribution to one or more digital cinemas by various means, such as via Internet, Satellite, or physical delivery on a storage medium such as a disk.

The digital video output file generated at the completion of step 24 also serves as the final Digital Intermediate (digital master) for creating home video digital versatile (DVD) disks during step 26. Further color grading can occur during step 26 for consumer-type displays. As before, the digital output generated after final grading undergoes a transformation to emulate a film print. Dow conversion to HD or SD occurs as well with the final color grade burned in.

Figure 2:
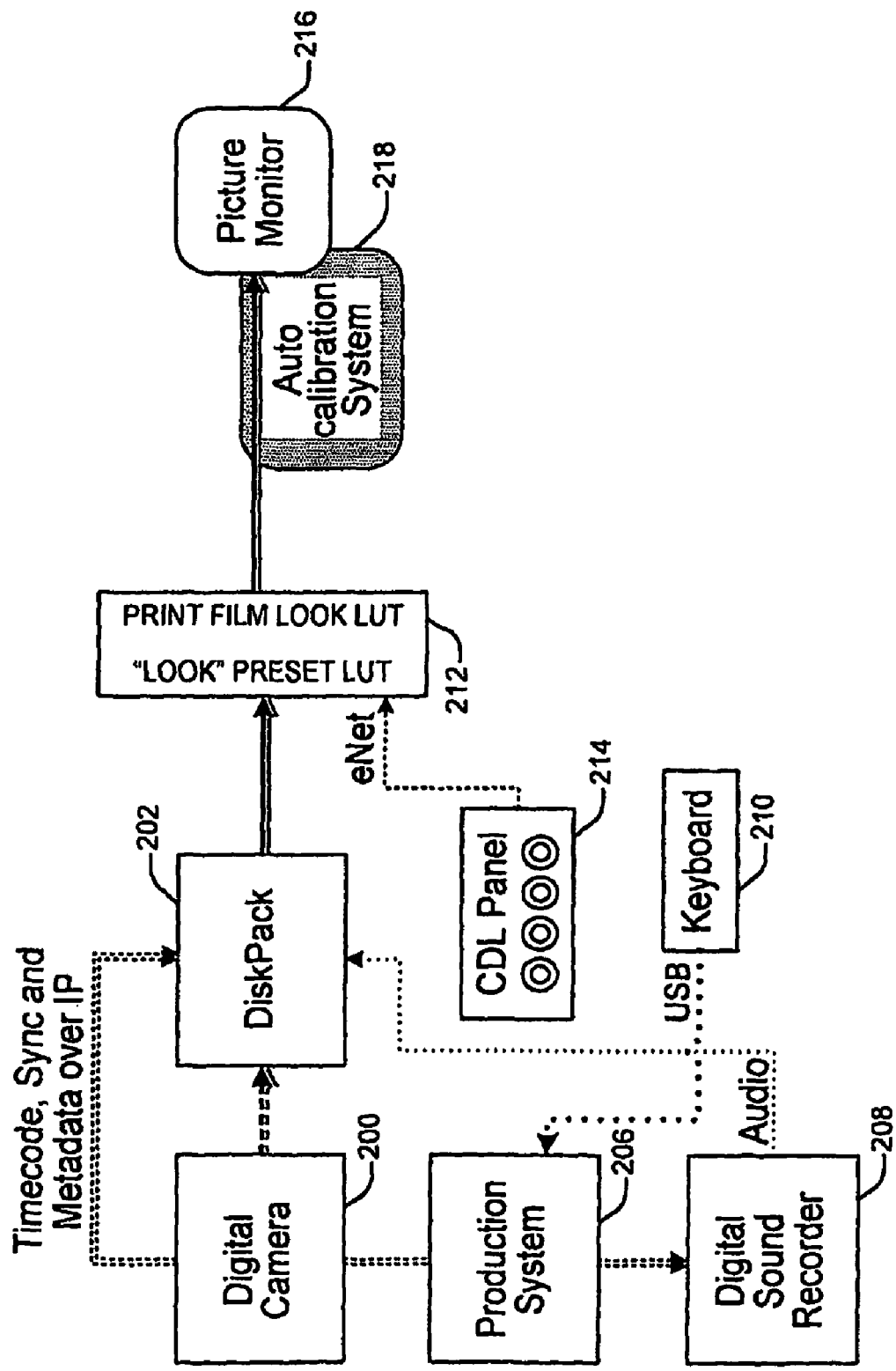
FIG. 2 depicts a block schematic diagram of the elements associated with a digital cinematography workflow in accordance with an illustrative embodiment of the new principles.

FIG. 2 depicts a block schematic diagram showing elements of a workflow for digital production during step 12 of FIG. 1. As shown in FIG. 2, at least one digital image capture device 200 serves to capture images in digital form (e.g., a stream of digital video). In the illustrative embodiment, the digital image capture device comprises one or more digital television camera, such as the "Viper" Film Stream digital camera from Thomson Grass Valley. A storage device 202 stores the digital video output signal/file(s) generated by the image capture device 200, along with time code knowledge, synchronizing signal/file(s)s and metadata. The storage device 202 typically comprises one or more magnetic disk drives arranged in an array. For example, the storage device 202 can comprise the "Venom" disk storage pack from Thomson Grass Valley. In practice, the time code knowledge, synchronizing signal/file(s)s and metadata pass to the storage device 202 out of band from the digital video signal/file(s) generated by the digital image capture device 200.

A production system 206 receives the time code knowledge, synchronizing signal/file(s)s and metadata from the digital image capture device 200 for embedding in the audio recorded by a digital sound recorder 208. The production system 206 also collects Color Decision List (CDL) and/or Automatic Link Enablement data (ALE) generated hereinafter as discussed below for subsequent export for use by other systems (not shown). In practice, the digital sound recorder 208 records audio associated the visual information captured by the digital image capture device 200. Audio from the digital sound recorder 208 undergoes storage in the storage device 202, along with the digital output signal/file(s) representing captured images, along with, the time code knowledge, synchronizing signal/file(s)s and metadata.

In addition to embedding the time code knowledge, synchronizing signal/file(s)s and other metadata, the production system 206 can also embed external information entered by an operator through a keyboard 210 such as Color Decision List (CDL) and/or Avid Log Exchange (ALE) data. Typically, the keyboard 210 connects to the production system 206 through a Universal Serial Bus (USB) connection. Other well known protocols could serve to facilitate coupling the keyboard 210 to the production system 206.

A processing system 212 processes digital output signal/file(s) from the storage device 202 using the accompanying time code knowledge, synchronizing signal/file(s)s and metadata. Additionally, the processing system 212 can make use of CDL data received from a CDL entry device 214 to enable color adjustments. In practice, an operator, usually referred to as a "colorist" will make adjustments through the CDL entry device 214 to the color of the captured images. Such adjustments allow the Director and/or Director of Photography to see how corresponding color adjustments might impact the final version the audio-visual program produced from the captured video. Adjustments to other image parameters can be made in a similar manner, using an input device (not shown), similar to the CDL entry device 214.

The processing system 212 typically comprises one or more programmed computers that include or have access to one or more Look-Up Tables (LUTs) that can transform the capture image information embodied in the digital output signal/file(s) originated by the digital image capture device(s) to emulate a film print as discussed previously. The LUTs can undergo dynamic change, especially in response to the color adjustments entered via the CDL entry device 214. In this way, the processing system 212 can transform captured images embodied in the digital output signal/file(s) to emulate a film print as well as to change the overall appearance of captures images, such as by modifying their color and/or other image characteristics.

The digital video output signal/file(s) transformed by the processing system 212 typically undergo display on a display device 216, such as a video monitor. To assure optimal picture quality, an automatic calibration system 218 will periodically calibrate the display device 216 with regard to various settings, such as color, linearity, focus and contrast for example.

Figure 3:
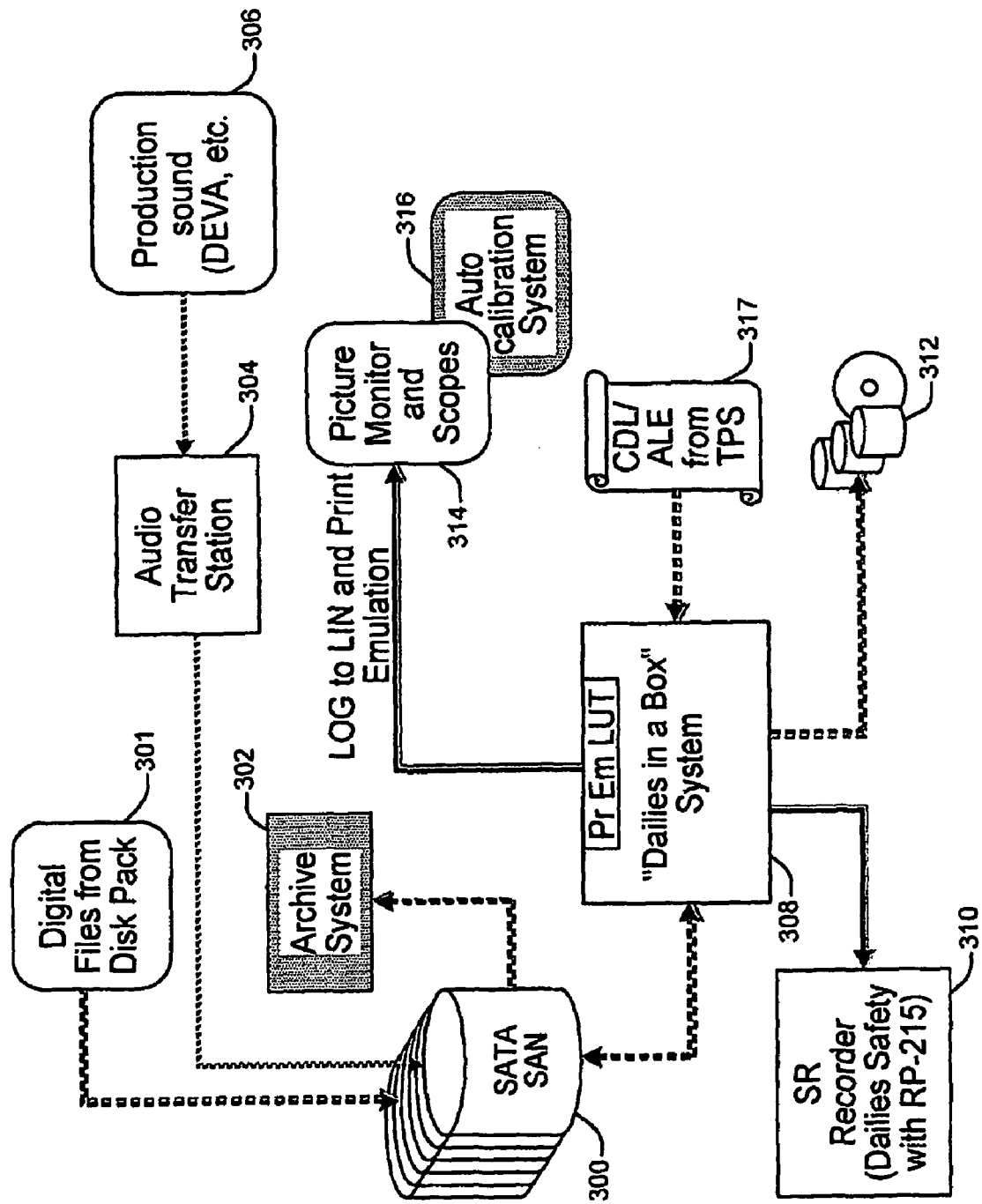
FIG. 3 depicts a block schematic diagram of the elements associated with a digital cinematography workflow for producing digital dailies from images captured by a digital video camera in accordance with an illustrative embodiment of the new principles.

FIG. 3 a block schematic diagram showing the elements of a workflow for production of instant dailies in connection with dailies viewing during step 16 of FIG. 1. As seen in FIG. 3, at least one storage facility 300, typically in the form of a Storage Area Network (SAN) receives digital video output signal/file(s) 301 from the system 212 of FIG. 2 following their transformation to emulate a film print. Preferably, the SAN 300 makes use of Serial Advanced Technology Attachment (SATA) for connecting to other devices. An archive system 302 connected to the SAN 300 can create one or more deliverables comprising all or a portion of the digital output signal/file(s) stored in the SAN. In practice, such deliverables take the form of tapes or other transportable storage mediums, such as transportable hard disk drives, that store information for export to an external entity, such as a visual special effects (VFX) facility.

The SAN 300 of FIG. 3 can also receive digital audio from an audio transfer station 304 supplied with audio from one or more sources 306, only one of which is shown. In practice, the audio source(s) 306 could include digital sound recorders or other devices that provide audio in digital form. The audio transfer station 304 enables editing of the digital audio prior to storage in the SAN 300. The audio transfer station 304 can include any of several different types of systems for performing post-production operations, including but not limited to audio correction and/or adjustment. In the illustrated embodiment, the audio transfer station 304 comprises part of the Thomson Grass Valley "Bones" post production framework, which includes one or more processors programmed with software that allows editing, correction and/or manipulation of digital audio.

The digital output signal/file(s) stored in the SAN 300, which embody one or more audio-visual programs in digital form, undergo processing via a processing system 308. Like the processing system 212 of FIG. 1, the processing system 308 of FIG. 3 includes one or more LUTs for transforming digital output signal/file(s) so that the images embodied in those files emulate the look of a motion picture film print. The LUT(s) also enable changing the appearance of one or more images characteristics, such as color, the latter occurring in accordance with Color Decision List (CDL) and/or Automatic Link Enablement (ALE) information 317 exported from the production system 206 of FIG. 2. In practice, the processing system 308 comprises the Thomson Grass Valley "Bones" post production framework. A single post production framework, such as the "Bones" post production framework, could perform the functions of the processing system 308 and the audio transfer station 304 of FIG. 3.

The processing system 308 generates digital output signal/file(s) that embody one or more audio-visual program(s) in digital form, along with associated time code knowledge, synchronizing information and metadata for distribution to several destinations. The audio-visual program(s) embodied in the digital output signal/file(s) generated by the processing system 308 typically have undergone a transformation to emulate a film-print. The processing system 308 can also provide the digital output signal/file(s) embodying the audio-visual program(s) to a recorder 310. Also, the processing system 308 can output the digital output more files in any one of a variety of formats 312, such as JPEG 2000, Avid® Media, Apple® FCP, DVD images and the like. Further, the processing system 308 can make use of one or more internal look-up tables to convert LOG-based video embodied in the digital output signal/file(s) to linear-based video and to apply film print emulation to yield video for display on a display system 314, such as a video monitor or a scope. An auto calibration system 316, similar to auto calibration system 218, serves to calibrate the display system 314.

Figure 4:
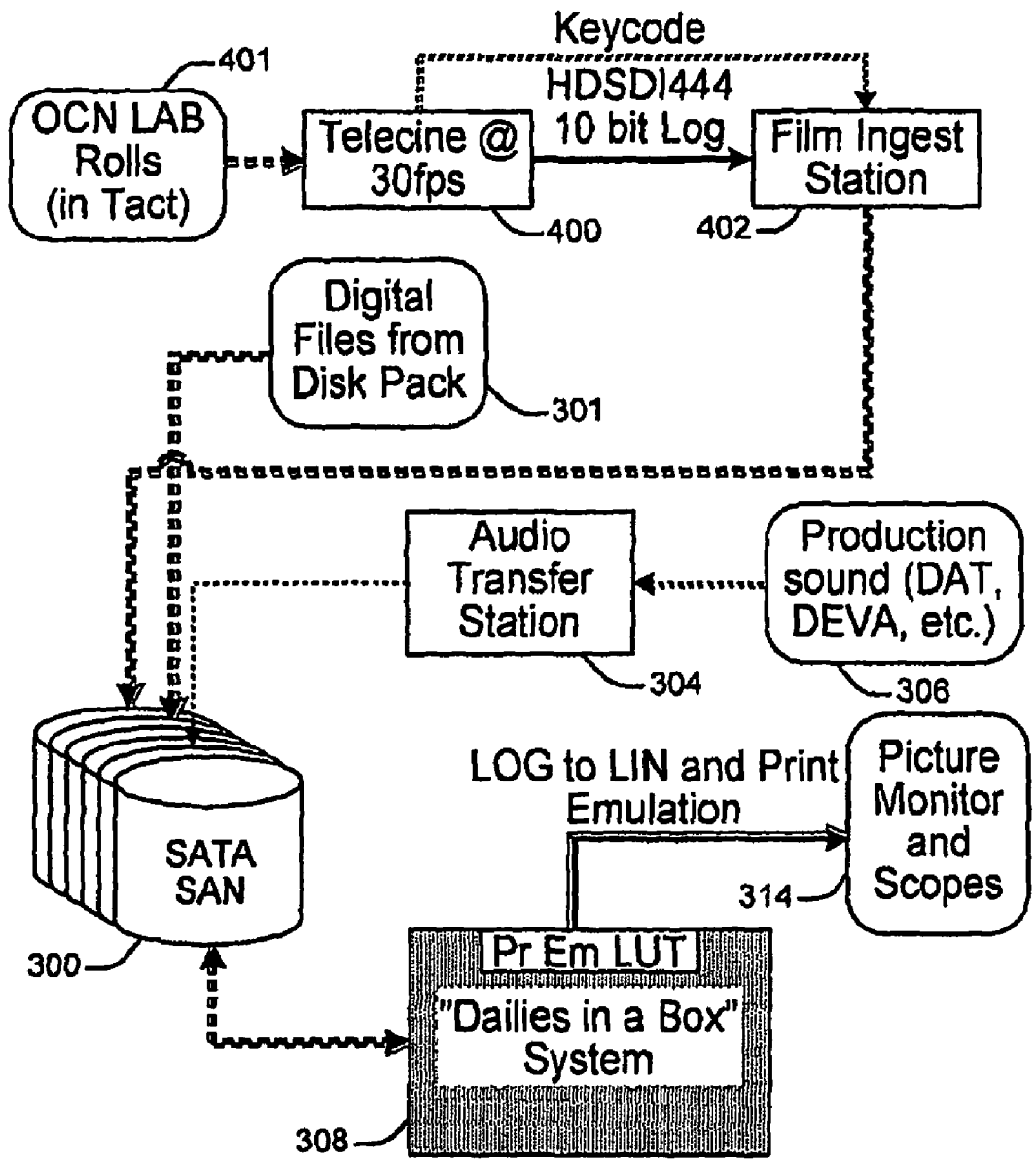
FIG. 4 depicts a block schematic diagram of the elements associated with a workflow for producing dailies from images captured by a film camera in accordance with an illustrative embodiment of the new principles.

FIG. 4 depicts a block schematic diagram showing the elements of a workflow for producing digital dailies from filmed images created during film production in step 14 of FIG. 1. The workflow of FIG. 4 contains many elements in common with the workflow of FIG. 3 and therefore, like reference numbers reference like elements in FIG. 3. To transform the film images created during film production in step 14 of FIG. 1 into digital output signal/file(s), the workflow of FIG. 4 makes use telecine 400, such as the Thomson Grass Valley Spirit film scanner, for scanning Original Camera Negative (OCN) rolls 401. The Thomson Grass Valley "Spirit" film scanner offers both 2K and 4K resolution, and thus can generate two separate files for a scanned film, one having 4K resolution and the other with 2K resolution. In practice, the scanner 400 operates at 30 frames per second (fps), which is typically faster than the 24 fps, the speed at which images are typically captured onto the OCN rolls 401, thereby allowing the scanner to operate at greater than real time speed, as measured with respect to the film exposure rate.

The scanner 400 has a ten-bit High Definition Serial Data Interface (HD SDI) for generating digital output signal/file(s) in a 4:4:4 format for receipt at a receiving (e.g., ingest) station 402, typically part of the Thomson Grass Valley "Bones" post processing framework. In practice, the ingest station 402 also receives a key code from the scanner 400 identifying the particular OCN roll 401 undergoing scanning. The receiving station 402 collects the digital output signal/file(s) from the scanner 400 for transfer to the SAN 300 to allow further processing by the processing system 308 as described previously with respect to FIG. 3. In addition to receiving digital output signal/file(s) originated by the scanner 400 and stored by the SAN 300, the processing unit 308 also receives audio files stored by the SAN 300 following their receipt from the audio transfer station 304 which processed such files received from one of the audio sources 306. Also, as described previously, the archive system 302 connected to the SAN 300 can create one or more deliverables comprising all or a portion of the digital output signal/file(s) stored in the SAN.

The processing system 308 generates more or more digital output signal/file(s) embodying one or more audio-visual programs for display on a picture monitor or scope 314. As described previously with respect to FIG. 3, the processing system 308 can make use of one or more internal look-up tables to convert LOG-based video embodied in the digital output signal/file(s) to linear-based video and to apply film print emulation in connection with the digital output signal/file(s) supplied to the display device 314.

Figure 5:
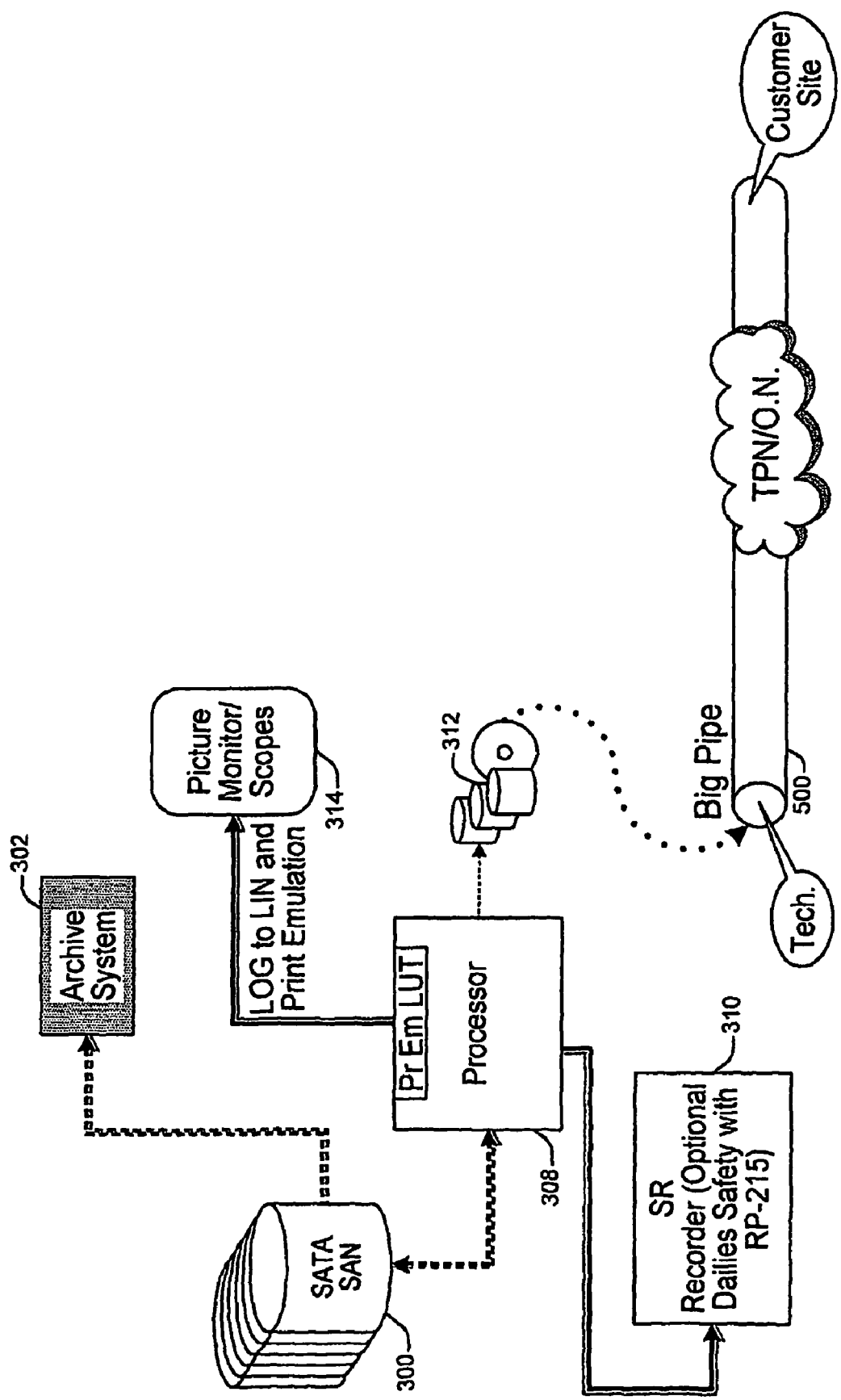
FIG. 5 depicts a block schematic diagram of the elements associated with a workflow for producing digital dailies and for achieving quality control in accordance with an illustrative embodiment of the new principles.

FIG. 5 depicts a block schematic diagram showing the elements of a workflow for dailies distribution in connection with the dailies viewing operation in step 16 of FIG. 1. The dailies distribution workflow of FIG. 5 utilizes many of the same elements as the workflows depicted in FIGS. 3 and 4 and like reference numbers reference like elements. As discussed above with respect to FIGS. 3 and 4, the SAN 300 supplies the processing system 308 with digital output signal/file(s) processing, (the files including both video and audio, typically combined in one or more audio-visual programs). In the course of such processing by the processing system 308, an operator can undertake quality control and verification as required. Also, as described previously, the SAN 300 provides digital output signal/file(s) to the archive system. 302 which can create one or more deliverables comprising all or a portion of the digital output signal/file(s) stored in the SAN.

The digital output signal/file(s) produced by the processing system 308 embody one or more audio-visual-programs in one or more formats 312. Such files constitute digital dailies for display on the display device 314. As discussed previously, the processing system 308 can make use of one or more internal look-up tables to convert LOG-based video embodied in the digital output signal/file(s) to linear-based video and to apply film print emulation in connection with the digital output signal/file(s) supplied to the display device 314.

The audio-visual program(s) embodied in the files output by the processing system 308 typically undergo transmission via a network 500. The transmission network 500 can comprise one or more public and/or private networks, which can include wired and/or wireless networks of various types. Selection of the network(s) will depend on bandwidth and time availability. Prior to transmission on the network 500, the digital output signal/file(s) can undergo watermarking, typically via a watermarking station (not shown) that performs "Nextamp Watermarking" using software such as the "Portable Media Package (PMP).

Figure 6:
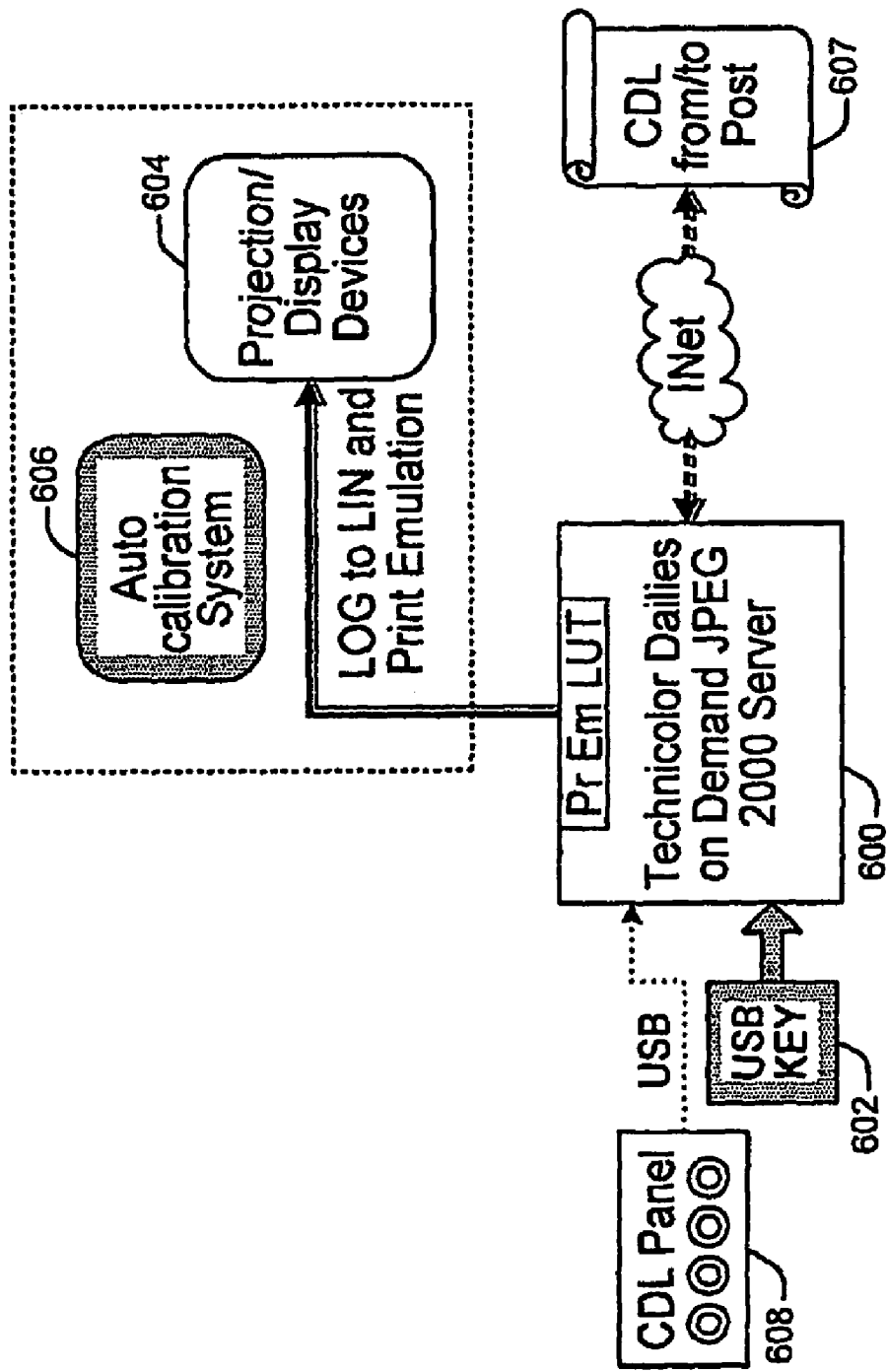
FIG. 6 depicts a block schematic diagram of the elements associated with a workflow for on-set dailies viewing in accordance with an illustrative embodiment of the new principles.

FIG. 6 depicts a block schematic diagram showing elements of a workflow for on-set dailies viewing during step 16 of FIG. 1. As illustrated in FIG. 6, a server 600 receives one or more of the digital output signal/file(s) containing one or more audio-visual programs embodying the digital dailies for viewing, such as those produced by the processing system, 308 of FIGS. 3-5. In practice, the digital output signal/file(s) received by the server 600 take the form of raw uncorrected source files encoded in the JPEG 2000 format. In order to commence play out, the serve 600 must receive a security code, typically entered via a Universal Serial Bus (USB) flash memory device 602. Other data entry devices, such as a keyboard (not shown) could facilitate entry of the security code.

Upon receipt of the proper security code via the flash memory 602, the server 600 will supply one or more digital output signal/file(s) whose video exists in a LOG format for display on a display device 604 to effect the display of digital dailies. To emulate a film print for display on the display device 604, the server 600 can perform a LOG to LIN conversion of the video embodied in the digital output signal/file(s) via a LUT, prior to receipt of the signal/file(s) by the display device. To assure color consistency, a calibration system 606 can serve to calibrate the display device 604.

The server 600 can makes use of CDL data 607 supplied from a server (not shown) at a post facility during real time viewing of digital dailies on the display device 604. During such viewing, the Director and/or Director of Photography can make changes to the CDL. To that end, a CDL entry device 608 connects to the server 600 to enable adjustments to the CDL. Other image adjustments can be made in a similar manner through the use of corresponding image adjustment entry devices (not shown). Following changes made to the CDL via the CDL entry 608, the server 600 will transmit those changes to the CDL server 607 at the post facility.

Figure 7:
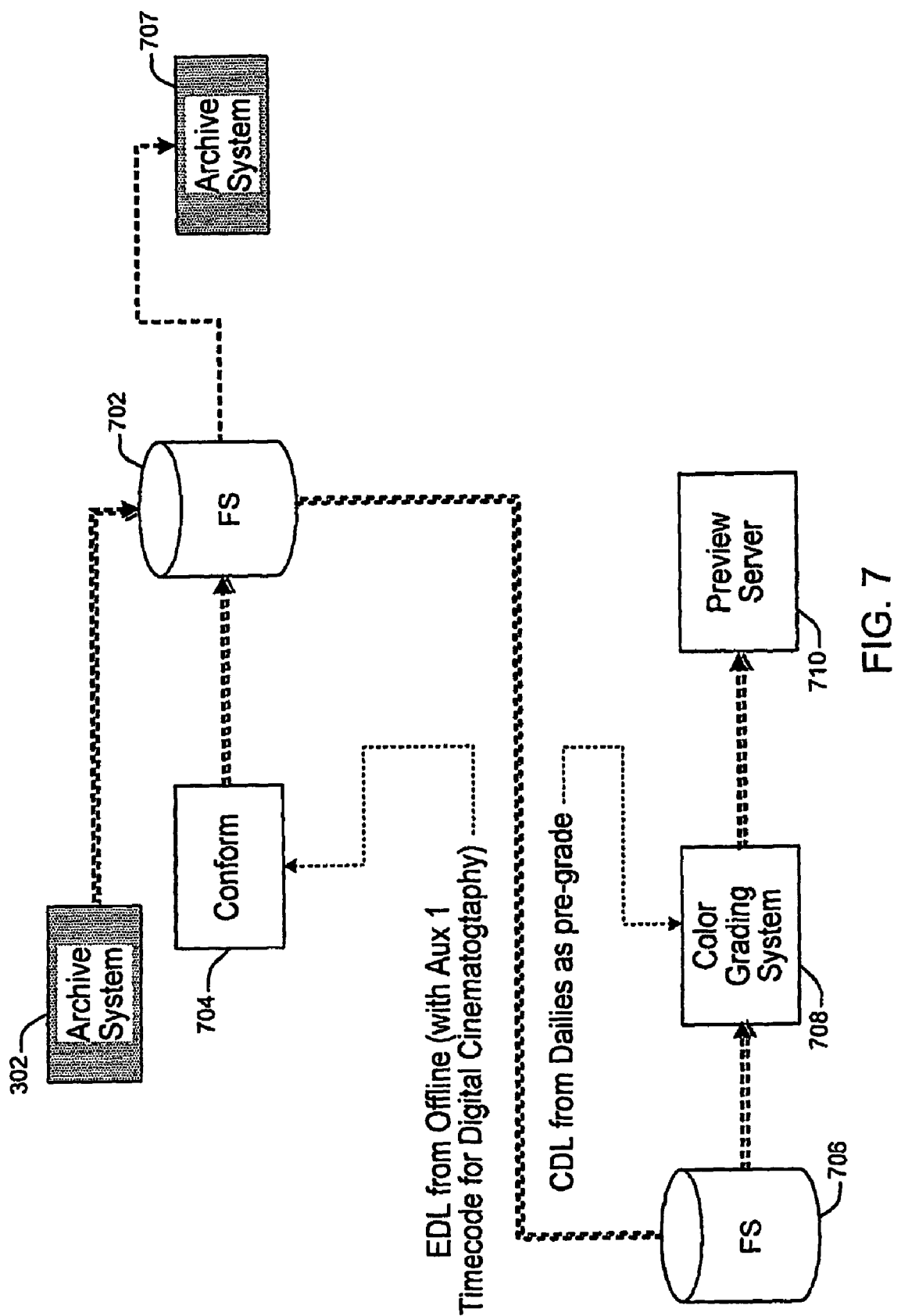
FIG. 7 depicts a block schematic diagram of the elements associated with a workflow for post-preview conformation and timing in accordance with an illustrative embodiment of the new principles.

FIG. 7 depicts a block schematic diagram showing the elements of a workflow for post-preview conformation and timing in connection with step 20 of FIG. 1. The conformation performed during the workflow of FIG. 7 corresponds to the traditional segmentation and rearrangement of original camera negatives (OCNs) to yield a motion picture film. The timing performed during the workflow of FIG. 7, corresponds to the traditional process of adjusting (e.g., grading) the color balance of each scene. Referring to FIG. 7, a first server 702 receives one or more digital output signal/file(s) from the archive system 302, typically in a raw 4:4:4 log form. In practice, the server 702 comprises part of the Stone FS high speed fibre channel solution available from Autodesk Inc, San Raphael, Calif.

A conformation system 704 performs editing and finishing of the files supplied from the file server 702 in accordance with Edit Decision List (EDL) data, and time code information from one or more external sources. In practice, the conformation system 704 typically takes the form of one or more processors running image finishing software such as Autodesk FIRE® and/or Autodesk SMOKE® software. Such software (or its equivalent) enables the conformation system 704 to accomplish preview conformance (e.g., editing and assembling). Following editing and finishing, the conformation system returns 704 the signal/file(s) to the file server 702 for transfer to a second file server 706 and an archive system. 707. Like the server 702, the server 704 comprises part of the Stone FS high speed fibre channel solution available from Autodesk Inc, San Raphael, Calif.

A color grading system 708 performs color grading on the digital output signal/file(s) (i.e., audio-visual works) stored in the filer server 706 using CDL data associated with the digital dailies as a pre-grade. In practice, the color grading system 708 comprises one or more processors running color grading software such as Autodesk LUSTRE® software. The digital output signal/file(s) produced by the color grading system 708 undergo storage on a preview server 710.

Figure 8:
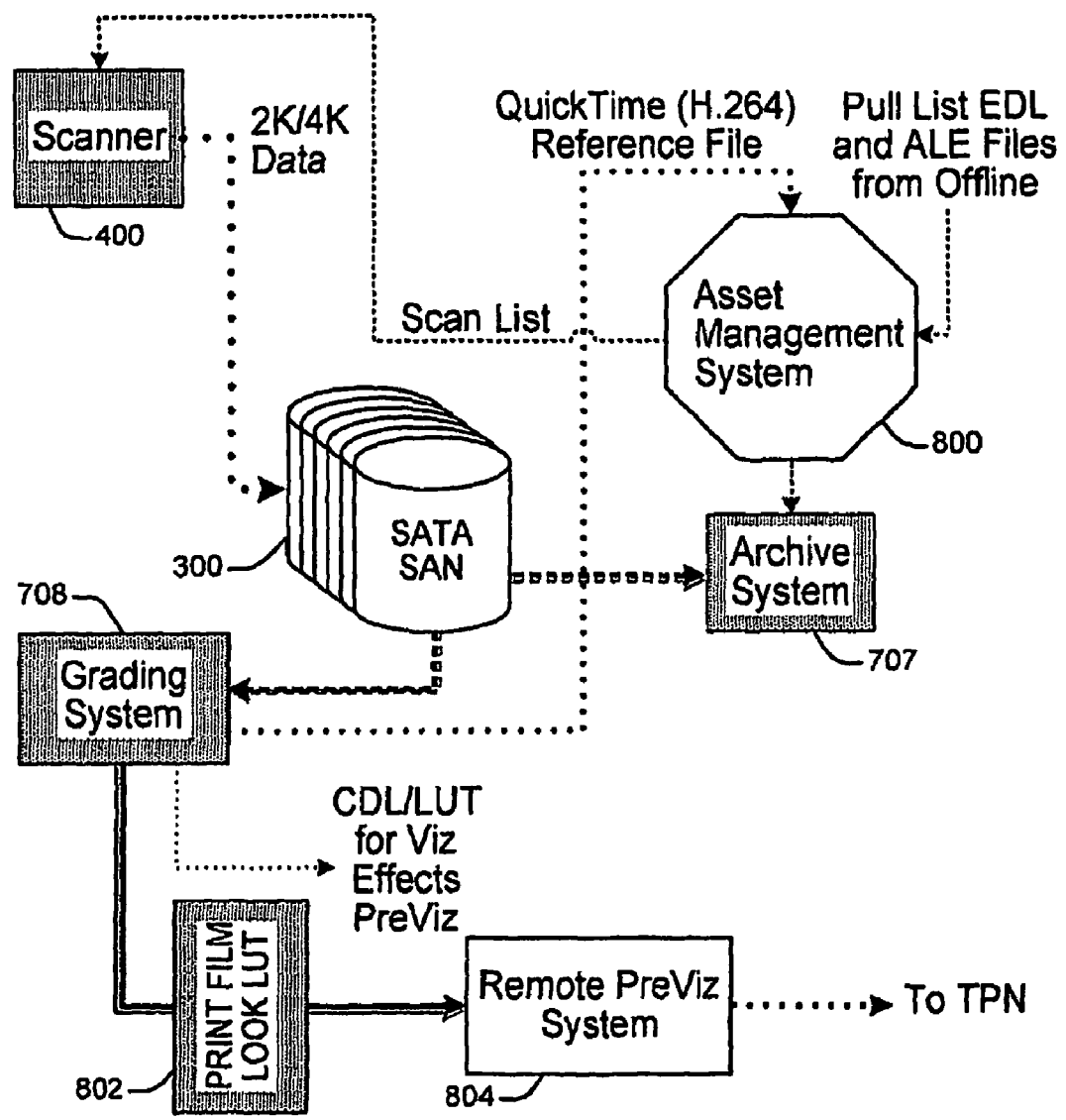
FIG. 8 depicts a block schematic diagram of the elements associated with a workflow for post visual effects scanning in accordance with an illustrative embodiment of the new principles.

FIG. 8 depicts a block schematic diagram showing the elements of a workflow for post-visual effects scanning in connection with visual effects production during step 22 of FIG. 1. The post-visual effects workflow makes use many of the elements described previously with respect to FIG. 4 and like reference numbers describe like elements. As described, the scanner 400 scans OCNs to yield both 2K and 4K resolution digital output signal/file(s) for storage in the SAN 300. In addition to supplying the 2K and 4K resolution output signal/file(s), the scanner 400 also supplies a scan list identifying the film scanned to an asset management system 800, typically comprising a database that resides on a server (not shown) for tracking various activities (typically referred to projects) in the course of post-visual effects scanning. Each project corresponds to a particular film scan, and to that end, the management system 800 will provide a link between such film scans and associated file names and key code relationships, as well as proxy information including links to other servers which can store information associated with that project. Additionally, for each project, the asset management system 800 can also store information regarding the identity of the entity responsible for providing visual special effects (VFX). Further, the asset management system 800 also has the capability of acquiring Edit Decision List(s) and/or ALE data from one or more external sources (not shown.)

The digital output signal/file(s) stored in the SAN 300 can undergo color grading via a color grading system 708 described with respect to FIG. 7. The color-graded digital output signal/file(s) then undergo transformation via a LUT 802 to emulate a film print. To that end, the LUT 802 typically will convert the video associated with the digital output signal/file(s) from LOG to LIN and apply print emulation for HD reference if needed. A remote preview system 804 serves to convert the digital output signal/file(s) transformed by the LUT 802, which typically exist in a JPEG 200 format, to an IP format for network streaming, such as over the Internet.

Figure 9:
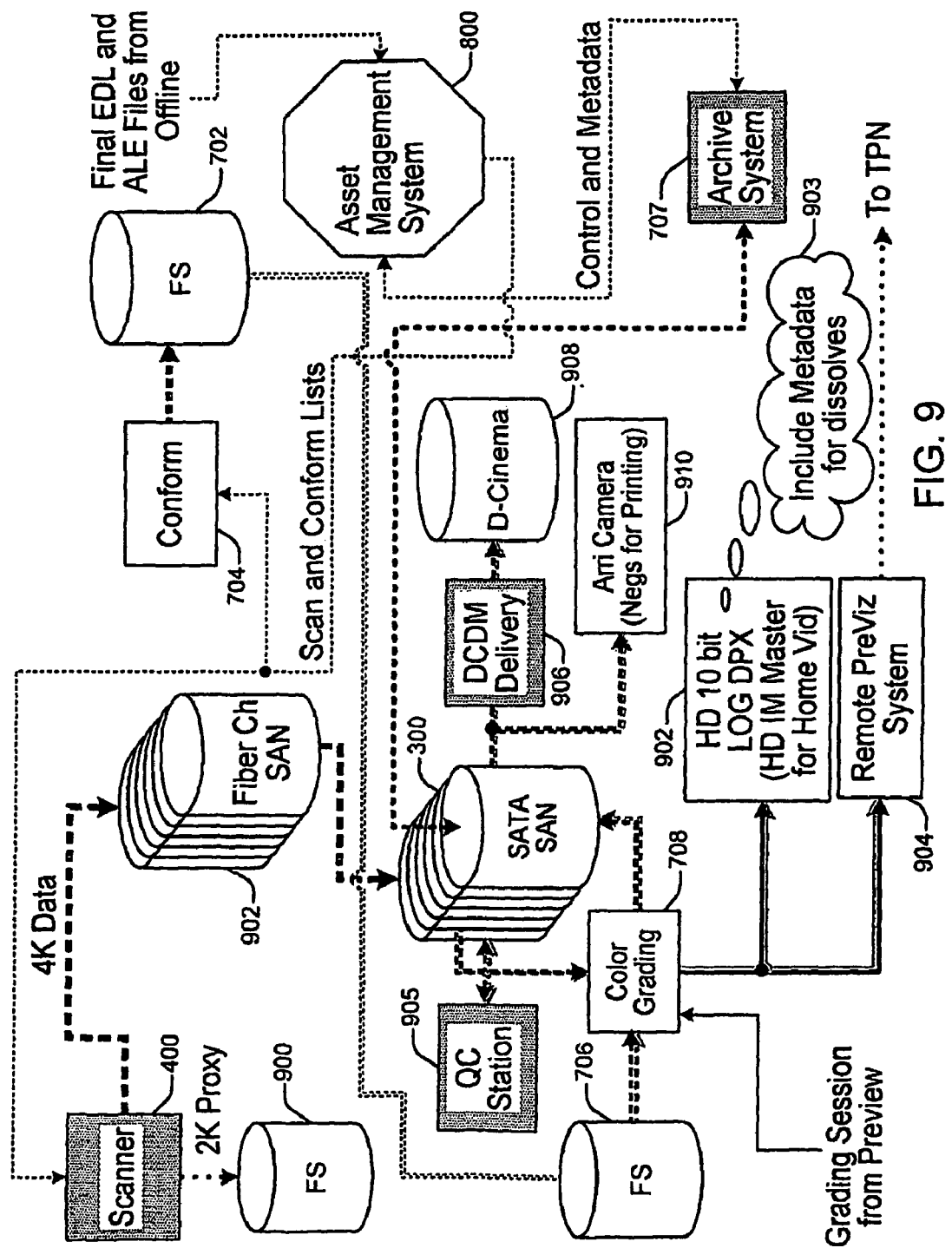
FIG. 9 depicts a block schematic diagram of the elements associated with a workflow for post-Digital Intermediate generation and finishing in accordance with an illustrative embodiment of the new principles.

FIG. 9 depicts a block schematic diagram showing the elements of a workflow for post-Digital Intermediate creation and finishing to yield finished one or more audio-visual program(s) for home distribution and the like in connection with step 26 of FIG. 1. The workflow of FIG. 9 shares many elements in common with the workflows of FIGS. 2-8 and like reference numbers describe like elements. The workflow of FIG. 9 makes use of a film scanner, such as scanner 400, to scan OCNs to yield both 2K and 4K resolution digital output signal/file(s). The 2K files from the scanner typically undergo storage in a file server 900, which like the file servers 702 and 706 of FIG. 7 comprises part of the Stone FS high speed fibre channel solution available from Autodesk Inc, San Raphael, Calif. The 4K resolution output signal/file(s) from the scanner 400 undergo storage in a Fiber Channel Storage Area Network (SAN) 902 for subsequent transfer to the SAN 300 which has links to the file servers 702 and 706 as discussed previously with respect to FIG. 7.

As discussed previously, the scanner 400 generates a scan list which is received by an Asset Management System, such as Asset Management system 800 described previously with respect to FIG. 8. The scan list can include conformation data for receipt by the Asset management system and by a conformation station, such as conformation system 704 of FIG. 7. The conformation system 704 makes use of the conformation data to perform conformation (e.g., editing and finishing) of digital output signal/file(s) transferred from the SAN 300 to the file server 702. The digital output signal/file(s) produced by the conformation system 704, which embody one or more audio-visual programs, undergo storage in the file 702 for subsequent transfer back to the SAN 300.

The now-conformed digital Output signal/file(s) undergo transfer from the SAN 300 to a file server, such as file server 706, for subsequent transfer to a color grading system, such as color grading system 708 described previously with respect to FIG. 7 for final color grading. After final color grading, the digital output signal/file(s), which now embody finished Digital Intermediate(s) (audio-visual program(s)) typically undergo conversion via a LUT 902 to transform the video embodied in the files into a HD 10-bit LOG DPX format suitable for using in mastering DVDs for consumer use. The transformed digital output signal/file(s) can include metadata 903 for dissolves. The now-conformed files also undergo a transfer to a remote pre-visualization server 904 to enable streaming to remote sites.

The SAN 300 of FIG. 9 has a link to a quality control station 905 which typically comprises part of the Thomson Grass Valley "Bones" post production framework. Using the quality control station 905, an operator can access stored digital output signal/file(s) embodying one or more audio-visual programs, from the SAN 300 for inspection and modification to improve the quality of at least one of the digital audio and video embedded within such files. To save time, the operator could begin a quality control review prior to completion of color grading.

The SAN 300 can deliver a digital output files, embodying one or more finished audio-visual program in digital form, for distribution to a Digital Cinema Distribution Master (DCDM) facility 906. In turn, the DCDM 906 facility serves to distribute the digital output signal/file(s) embodying such audio-visual programs in digital form to one or more digital cinemas such as digital cinema 908. The digital output signal/file(s) from the SAN 300 can also undergo transfer to a film printer 920, such as manufacture by Arri Camera, which can print a corresponding celluloid film negative. The SAN 300 enjoys a link to an archive system 707 similar to the archive system 202, for creating one or more deliverables for export to an external entity.

What has been described thus far with respect to FIG. 9 has been the workflow associated with 4K resolution digital output files to the film scanned by the scanner 400. As discussed above, the scanner 400 also yield 2K resolution digital output signal/file(s) stored in the server 900. Such files can undergo processing in the same manner as described for the 4K digital output files.

The foregoing describes systems and method for processing at least one of audio-visual information in connection with digital cinematography.

The invention claimed is:

1. A method, using at least one processor to perform the steps of:
   (a) generating an initial image decision list indicative of at least a one change in at least one characteristic of an image adjusted during a first image processing operation;
   (b) transforming the image to emulate a film print; and
   (c) modifying the initial image decision list to further adjust of the at least one characteristic of the image in accordance with the emulated film print during a second image processing operation to substantially normalize the modified image decision list relative to the initial image decision list.

2. The method according to claim 1 further comprising the step of:
   repeating steps (b) and (c) for a successive image processing operation.

3. The method according to claim 2 wherein said successive processing operation includes the step of image editing.

4. The method according to claim 2 wherein said successive processing operation includes previewing digital images.

5. The method according to claim 2 wherein said successive processing operation includes creating visual special effects.

6. The method according to claim 2 wherein said successive processing operation comprises producing finished audio visual files in digital form.

7. The method according to claim 2 wherein said successive processing operation comprises mastering a digital versatile disk.

8. The method according to claim 1 wherein the first image processing operation comprises image capture.

9. The method according to claim 8 wherein the step of image capture comprises digital image capture.

10. The method according to claim 8 wherein the step of image capture comprises film image capture.

11. The method according to claim 1 wherein the second image capture operation comprises the step of viewing captured images.

12. The method according to claim 1 wherein the step of generating an initial image decision list comprises the step of generating an initial color decision list (CDL) indicative of a change in image color.

13. The method according to claim 12 wherein the step of modifying the initial image decision list includes the step of modifying the initial color decision list.

14. Apparatus comprising:
   an image decision list data entry device for entering an initial image decision list indicative of at least a one change in at least one characteristic of an image adjusted during a first image processing operation; and
   first processing means for transforming the image to emulate a film print; and
   second processing means for modifying the initial image decision list to further adjust of the at least one characteristic of the image in accordance with the emulated film print during a second image processing operation to substantially normalize the modified image decision list relative to the initial image decision list.

15. The apparatus according to claim 14 wherein the first processing means includes at least one look-up table.

16. The apparatus according to claim 14 wherein the first processing means performs color grading.

17. The apparatus according to claim 14 wherein the second processing means performs color grading.

18. The apparatus according to claim 14 wherein the second processing means performs image conformance and timing.

* * * * *